US007013343B2

(12) United States Patent
Shigezumi

(10) Patent No.: US 7,013,343 B2
(45) Date of Patent: Mar. 14, 2006

(54) DNS SERVER FILTER CHECKING FOR ABNORMAL DNS PACKETS

(75) Inventor: Makiba Shigezumi, Tokyo (JP)

(73) Assignee: NEC Corporation, Tokyo (JP)

( * ) Notice: Subject to any disclaimer, the term of this patent is extended or adjusted under 35 U.S.C. 154(b) by 893 days.

(21) Appl. No.: 09/750,914

(22) Filed: Jan. 2, 2001

(65) Prior Publication Data

US 2001/0052007 A1    Dec. 13, 2001

(30) Foreign Application Priority Data

Jan. 21, 2000    (JP)    ............................ 2000-012757

(51) Int. Cl.
    G06F 15/16    (2006.01)
    G06F 15/173    (2006.01)
(52) U.S. Cl. ...................................... 709/232; 709/225
(58) Field of Classification Search ................ 709/223, 709/207, 209, 227, 225, 232, 233, 234, 235, 709/236; 713/201; 370/395.5
See application file for complete search history.

(56) References Cited

U.S. PATENT DOCUMENTS

| | | | |
|---|---|---|---|
| 5,805,820 A | | 9/1998 | Bellovin et al. |
| 5,848,233 A | * | 12/1998 | Radia et al. ................ 713/201 |
| 5,958,052 A | * | 9/1999 | Bellovin et al. ............ 713/201 |
| 6,003,084 A | * | 12/1999 | Green et al. ................ 709/227 |
| 6,128,279 A | * | 10/2000 | O'Neil et al. ............... 370/229 |
| 6,256,671 B1 | * | 7/2001 | Strentzsch et al. .......... 709/227 |
| 6,317,837 B1 | * | 11/2001 | Kenworthy .................. 713/200 |
| 6,321,267 B1 | * | 11/2001 | Donaldson ................... 709/229 |
| 6,374,292 B1 | * | 4/2002 | Srivastava et al. .......... 709/206 |
| 6,400,707 B1 | * | 6/2002 | Baum et al. ................. 370/352 |
| 6,430,623 B1 | * | 8/2002 | Alkhatib ...................... 709/245 |
| 6,434,600 B1 | * | 8/2002 | Waite et al. ................. 709/206 |
| 6,442,602 B1 | * | 8/2002 | Choudhry .................... 709/218 |
| 6,457,061 B1 | * | 9/2002 | Bal et al. ..................... 709/245 |
| 6,480,508 B1 | * | 11/2002 | Mwikalo et al. ............. 370/475 |
| 6,557,037 B1 | * | 4/2003 | Provino ........................ 709/227 |
| 6,604,143 B1 | * | 8/2003 | Nagar et al. ................. 709/229 |
| 6,728,885 B1 | * | 4/2004 | Taylor et al. ................ 713/201 |
| 6,732,165 B1 | * | 5/2004 | Jennings, III ................ 709/220 |
| 6,751,738 B1 | * | 6/2004 | Wesinger et al. ........... 713/201 |
| 6,795,443 B1 | * | 9/2004 | Jeong et al. .............. 370/395.5 |
| 2002/0083175 A1 | * | 6/2002 | Afek et al. .................. 709/225 |

FOREIGN PATENT DOCUMENTS

WO    WO 98/26555    6/1998

\* cited by examiner

*Primary Examiner*—Paul H. Kang
(74) *Attorney, Agent, or Firm*—Young & Thompson

(57) ABSTRACT

A DNS server filter comprising a packet receiving section for receiving an inquiry from a terminal or a DNS server in a DNS protocol and a response packet from a DNS server, a session management section for managing inquiries and response packets for an entire control having a session management table for managing inquiry requests, a packet verification section for verifying whether the inquiry and the response packet are abnormal, a request generating section for generating an inquiry packet to the DNS server, a response generating section for generating a response packet returned to a transmission source of the inquiry packet, and a packet transmitting section for transmitting the inquiry and the response packet, wherein contents of the received DNS packet are checked that there is no abnormality before the received DNS packet is transmitted to the DNS server and an error response packet is generated and returned to a request source if an abnormality is detected.

19 Claims, 9 Drawing Sheets

Fig.7

| Entry point address | Priority | Attribute |
|---|---|---|
| 50 | 51 | 52 |

DNS SERVER FILTER CHECKING FOR ABNORMAL DNS PACKETS

BACKGROUND OF THE INVENTION

1. Field of the Invention

The present invention relates to a network system, and more particularly to a filter apparatus of a domain name system (DNS) for managing a correspondence between an IP address and a domain name.

2. Related Background Art

A DNS (domain name system) is a service on a TCP/IP protocol for providing a host connected to a TCP/IP network with information of a name and an IP address, associated with each other, of the host connected in a network with a protocol (including a UDP (user datagram protocol) as a transport layer) using a TCP/IP (transport control protocol/Internet protocol) such as the Internet. In the DNS, a name called a domain name is used to put together hosts into an organization which they belong to; the domain name is hierarchichally appended to each organization type, each organization name, or each post in an organization such as a nation, a company, or a scientific or academic organization and the host name is assured of its uniqueness in the TCP/IP network by being combined with the domain name. For example, the WWW (world wide web) server of NEC Corporation which is a Japanese company connected to the Internet can be represented in a description form, "www.nec.co.jp" composed of "jp" indicating Japan, "co" indicating a company, "nec" indicating NEC Corporation, and "www" indicating a host name of the WWW server named in the company.

"nec.co.jp" of the "www.nec.co.jp" is a domain name indicating NEC Corporation allocated by an NIC (network information center) that is a domain name allocating institution in the Internet and "www" is a host name allocated in NEC Corporation. A host attempting to communicate using the TCP/IP protocol must know an IP address of a destination host and a host connected to the Internet attempting to connect to the WWW server using the TCP/IP protocol inquires of the DNS server an IP address corresponding to the name "www.nec.co.jp." The host attempting to connect to "www.nec.co.jp" inquires first of the DNS server for managing information at the top of a domain hierarchical structure in a DNS called a root server so as to be informed of a DNS server for managing the "jp" domain, next inquires of the DNS server for managing the "jp" domain to be informed of a DNS server for managing the "co.jp" domain, subsequently inquires of the DNS server for managing the "co.jp" domain to be informed of a DNS server for managing the "nec.co.jp" domain, and inquires an IP address corresponding to the host name "www.nec.co.jp" of the DNS server for managing the "nec.co.jp" domain and then the IP address of the host is returned if the name exists in the DNS server.

In an organization connected to the Internet, a firewall may be installed in some cases in a portion connected to the Internet to restrict communications directly to the outside of the organization with the TCP/I protocol for a security reason.

As a security requirement of an organization, there is a restriction against accesses from the outside of the organization to resources inside the organization with the TCP/IP protocol for a protection of information secret against the outside of the organization.

The DNS is also required to hide a name of the host connected to the network inside the organization, information on an IP address, and a domain name indicating a post name or a network configuration of the organization as completely as possible so as to prevent a network invader from invading the network inside the organization by using the information.

A conventional system meets the above requirement by installing a DNS server for providing information on a host for authorizing an access from a host outside the organization installed in the outside of the firewall in addition to the DNS server inside the organization, making settings for the DNS server inside the organization so that the host inside the organization can inquire recursively of the DNS server installed outside the firewall to obtain DNS information of the host outside the organization, and making settings for the DNS server and the firewall so that the DNS server installed outside the firewall cannot make an inquiry to the DNS server inside the organization.

The conventional system having this constitution causes problems of a need for installing a plurality of DNS servers and complicated management of the DNS servers.

As a security problem, protective measures are required against an attack called DoS (denial of service) attack which stops a service due to a problem on an implementation of a server program such as bugs by transmitting a packet in an illegal format to a attack-targeted server, and a necessity of these measures is pointed out for the DNS service.

Conventionally, if this kind of problem is pointed out, a developer of a service program must modify the service program.

Certainly, source files of a part of service programs are open to the public (bind for UNIX TM, etc.) and therefore it is said that the service programs can be replaced with ones coping with the DoS attack by a user who obtains a modified part different from the source or by a user who modifies the part and compiles the service programs.

If the source file is not open to public (for example, a DNS server included in Windows NT Server 4.0 made by Microsoft Corporation), however, a long time is taken until a service program developer distributes modification modules to service program users and it has been a long time since the DoS attack or other problems are pointed out without appropriately coping with these problems.

Furthermore, even if a source file is open to public, a user cannot cope with these problems due to his or her insufficient programming skill or the like in some cases.

While the DoS attack has been described hereinabove, the same problems may occur unless a normal response to be obtained intrinsically is received due to a problem on an implementation of the service program even though the service is not stopped.

In addition, from a viewpoint of a network security management of organizations, there are some organizations imposing a security requirement of countermeasures for inhibiting anyone inside the organization from making an attack which can be a menace on a security against a host outside the organization.

In U.S. Pat. No. 5,805,820, there are provided in a DNS a method of inhibiting a transmission of private information such as a domain name and an IP address of a network inside an organization to the outside of the organization through a DNS by redirecting an inquiry request to the inside information of the domain and an apparatus for realizing it. It is, however, not capable of coping with the problems of the DoS attack or the like.

SUMMARY OF THE INVENTION

It is an object of the present invention to provide a DNS server filter and a record medium for preventing somebody outside an organization from invading a network of the organization by using private information of the organization and for preventing the DNS server from operating abnormally by receiving a packet in an abnormal format.

The DNS server filter of the present invention for achieving the above object has packet verification means for verifying whether there is any abnormality in a received DNS packet before the packet is transmitted to a DNS server and for generating an error response packet and returning it to a request source if an abnormality is detected.

The present invention comprises a packet receiving section for receiving an inquiry from a terminal or a DNS server in a DNS protocol and a response packet from the DNS server, a session management section for managing inquiries and response packets for an entire control having a session management table for managing DNS inquiry requests, a packet verification section for verifying whether there is any abnormality in the inquiry and the response packet, a request generating section for generating an inquiry packet to a DNS server, a response generating section for generating a response packet to be returned to a transmission source of the inquiry packet, and a packet transmitting section for transmitting the inquiry and the response packet, wherein it is verified whether there is any abnormality in contents of the received DNS packet before the packet is transmitted to the DNS server and an error response packet is generated and returned to a request source if an abnormality is detected.

BRIEF DESCRIPTION OF THE DRAWINGS

The invention will be understood more fully from the detailed description given here below and from the accompanying drawings of preferred embodiments of the invention, which, however, should not be considered as limiting the invention but are for explanation and understanding only.

FIG. 7 is a diagram showing an example of entries of a program management table of the packet verification section according to an embodiment of the present invention;

Here, it should be noted that like reference numerals represent like elements throughout the disclosure.

DETAILED DESCRIPTION OF THE PREFERRED EMBODIMENTS

Figure 1:
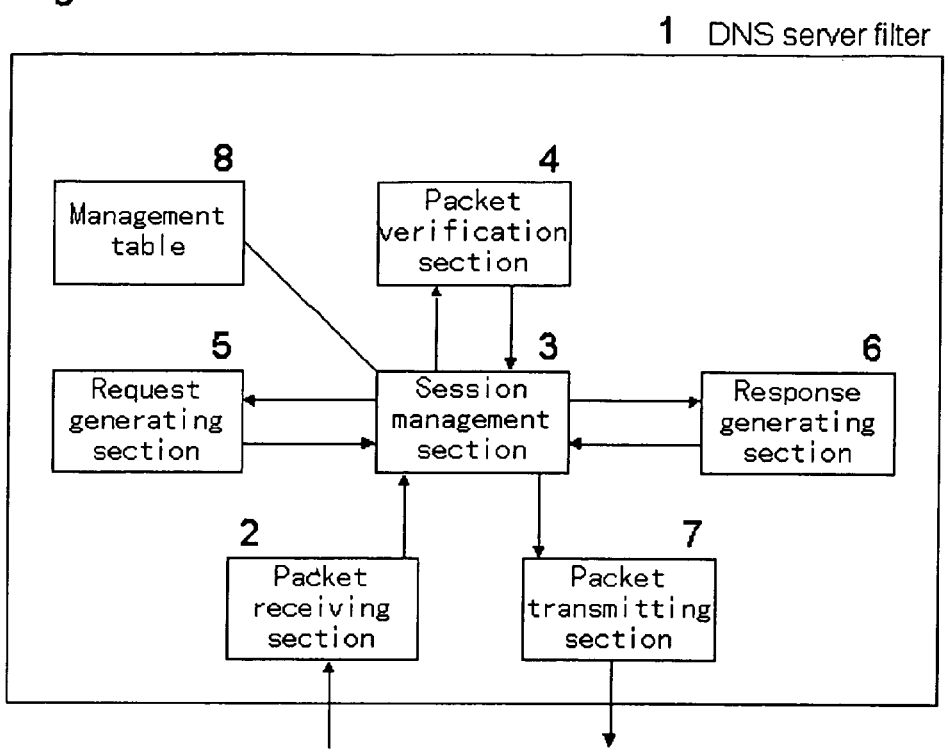
FIG. 1 is a diagram showing a constitution of a DNS server filter according to an embodiment of the present invention.

Embodiments of the present invention will be described below.

A DNS (domain name system) server filter of the present invention checks the contents of a DNS packet before transmitting it to a DNS server in a network system including the DNS server for providing services of associating an IP address, a host name, and a domain name with each other using a DNS protocol defined by RFC (request for comments) 1034, 1035 and by an RFC document related to them and returns an error response if an abnormality is detected, so that a user can add or delete processing for verification.

According to the present invention, it is possible to protect a DNS server in an internal network and an internal network system from the following attacks on security to prevent an external network from causing an abnormal operation with a DNS protocol or from making an attack on security so as to take a prompt action for problems related to a DNS:

The DNS server causes an abnormal operation by receiving a DNS packet in an abnormal format from an external network.

A host of the internal network transmits a DNS packet in an abnormal format through the DNS server to an external network to cause a host belonging to the external network to operate abnormally.

A network invader outside an organization accesses internal network information from an external network for a purpose of obtaining the information and obtains the internal network name information.

The present invention comprises a packet receiving section (2) for receiving an inquiry from a terminal or a DNS server in a DNS protocol and a response packet from the DNS server, a session management section (3) for managing inquiries and response packets for an entire control having a session management table (8) for managing DNS inquiry requests, a packet verification section (4) for verifying whether there is any abnormality in an inquiry and a response packet, a request generating section (5) for generating an inquiry packet to a DNS server, a response generating section (6) for generating a response packet to be returned to a transmission source of the inquiry packet, and a packet transmitting section (7) for transmitting the inquiry and the response packet, wherein it is verified whether there is any abnormality in contents of the received DNS packet before the packet is transmitted to the DNS server and an error response packet is generated and returned to a request source if an abnormality is detected.

The packet verification section (4) comprises a calling management section (30) for selecting and executing a verification program to be executed by referring to an attribute of the verification software, having a program management table (40) including an entry point address of the verification program, a priority of executing the verification program, and attribute information of the verification program, a load management section (36) for loading on a memory an execution file of the verification program specified by a management tool or by a setting file, initializing the loaded verification program, registering an entry point of the verification program with an obtained attribute into the program management table of the calling management section, and releasing a verification program specified to be deleted from the memory by the management tool, and a service routine (31) composed of a subroutine group for using functions of the DNS server filter body called by the verification program.

In a preferred embodiment of the present invention, the session management table (8) comprises a request packet pointer (60), an IP address (61) of a request source issuing an inquiry request, a port number (62) of a request source issuing an inquiry request, and a flag indicating whether or not an inquiry request has been transferred to another DNS server if a packet format of the inquiry request is normal, wherein the packet receiving section (2) receives a DNS packet and transmits the packet to the session management section (3), the session management section (3) sets an IP address of a transmission source of the received packet, a port number of the received packet, and a flag indicating "Testing" in the session management table (8), before the session management section (3) transmits the received packet to the packet verification section (4) to request a packet verification, by which the packet verification section (4) verifies the packet, and the session management section (3) checks a type of the received packet if there is a problem in the verification result to judge whether or not it is an inquiry request, the session management section requests the response generating section (6) to generate an error response packet if it is an inquiry request, requests the packet transmitting section (7) to transmit the generated packet to a destination specified by the request source IP address and the port number in the session management table (8), deletes information registered in the session management table (8) regarding the received response packet, and releases the received inquiry request packet.

Unless the received packet is an inquiry request, the session management section (3) searches the session management table (8) to fetch a portion related to an original inquiry request, refers to an inquiry request packet from a pointer to a request packet among the entries of the searched session management table (8), requests the response generating section (6) to generate an error response packet based upon it, requests the packet transmitting section (7) to transmit the generated response packet to a destination specified by the request source IP address and the port number in the session management table (8), deletes information registered in the session management table (8) regarding the received response packet to release the response packet, and deletes an entry registered in the session management table regarding an inquiry request corresponding to the response packet.

In addition, the packet verification section (4) verifies a packet; if there is no problem in the verification result, the session management section (3) checks a type of the received packet, and if it is a response packet, the session management section (3) searches the session management table (8) for information of an inquiry request corresponding to the response packet, verifies whether the received response packet can be a response to the original inquiry request, and if there is a need for making an additional inquiry as a result of the verification, the session management section (3) determines a next inquiry destination from the received response packet information, the session management section (3) requests the request generating section (5) to generate an inquiry request packet and requests the packet transmitting section (7) to transmit it to the next inquiry destination, the session management section (3) releases the response packet by deleting information on the response packet in progress of the received inquiry from the session management table, and if it receives a response packet which can be a response to the original inquiry packet as a result of the verification, the session management section (3) requests the response generating section (6) to generate a response packet to the original inquiry request reflecting a result of the response packet of receiving the response packet, requests the packet transmitting section (7) to transmit it to a transmission source of the original inquiry request, deletes information related to the received response packet from the session management table (8), and releases the response packet by deleting the information related to the original inquiry request from the session management table (8).

If the received packet is an inquiry request, the session management section (3) checks the transmission source of the received packet, and unless the inquiry is issued from a network inside the organization as the transmission source, in order to meet the inquiry request from a network outside the organization, the session management section (3) first determines a DNS server outside the organization for an inquiry, requests the request generating section (5) to generate an inquiry request based upon the original inquiry request, requests the packet transmitting section to transmit the inquiry request packet to the determined DNS server, and if the inquiry is issued from a network inside the organization as the transmission source, the session management section (3) requests the request generating section (5) to generate an inquiry request packet based upon the received inquiry request packet, and requests the packet transmitting section (7) to transmit an inquiry packet to the DNS server, and then the session management section (3) sets an "Inquiring" value to a flag among the entries of the session management table (8) corresponding to the received packet and sets the pointer to the received packet to the entry pointer in the session management table (8).

The present invention comprises:

(a) packet receiving processing for receiving an inquiry from a terminal or a DNS server in the DNS protocol and a response packet from the DNS server via a communication apparatus;

(b) session management processing for managing inquiries and response packets for an entire control having a session management table for managing DNS inquiry requests;

(c) packet verification processing for verifying whether the inquiry and the response packet are abnormal;

(d) request generation processing for generating an inquiry packet to the DNS server and response generation processing for generating a response packet returned to a transmission source of the inquiry packet; and (e) packet transmitting processing for a control of transmitting the inquiry and the response packet via the communication apparatus, wherein the above processing of the DNS server filter, verifying whether there is any abnormality in the contents of the received DNS packet before transmitting the packet to the DNS server and generating and returning an error response packet if an abnormality is detected, is realized by executing an execution program on a computer. In this condition, the DNS server filter of the present invention can be operated by downloading the program from a record medium containing the program through a reader or through a communication medium, reading it out and installing it on a computer, and loading an execution format of the program on a main memory of the computer to execute the program.

Embodiments of the present invention will be described below by referring to drawings.

Referring to FIG. 1, there is shown a diagram of a constitution of a DNS server filter according to an embodiment of the present invention. Further referring to FIG. 1, the DNS server filter 1 comprises a packet receiving section 2 for receiving an inquiry from a terminal or a DNS server in the DNS protocol and a response packet from the DNS server, a session management section 3 for managing inquiries and response packets for an entire control, a packet verification section 4 for verifying whether the inquiry and the response packet are abnormal, a request generating section 5 for generating an inquiry packet to the DNS server, a response generating section 6 for generating a response packet returned to a transmission source of the inquiry packet, and packet transmitting section 7 for transmitting the inquiry and the response packet. In addition, the session management section 3 has a session management table 8 for managing DNS inquiry requests.

Figure 2:
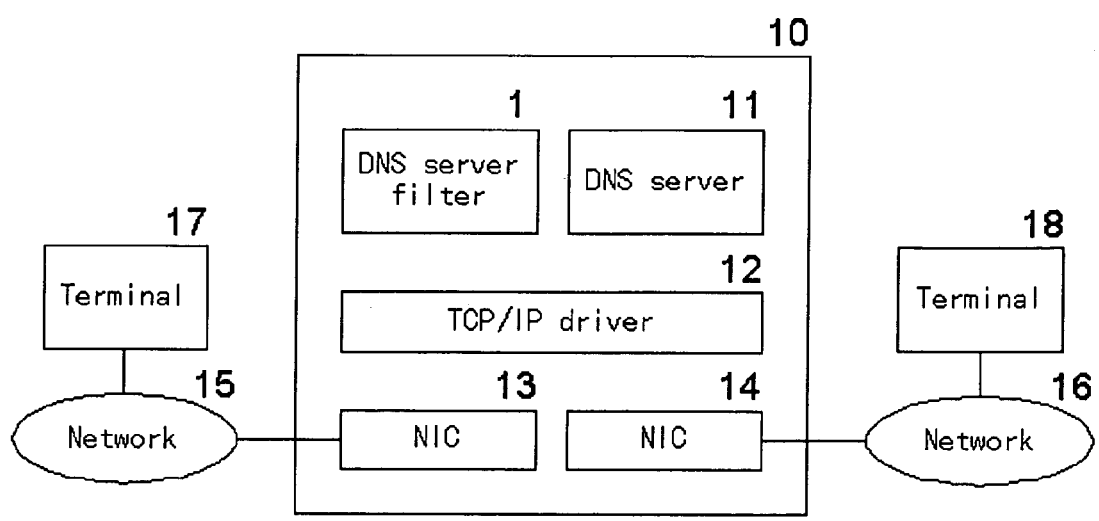
FIG. 2 is a diagram showing a constitution in which the DNS server filter according to an embodiment of the present invention is installed in a firewall.

Referring to FIG. 2, there is shown a diagram of an example of a constitution in which a DNS server filter 1 according to an embodiment of the present invention is installed in a firewall. In FIG. 2, a firewall 10 interconnects a network 15 outside the management of an organization in which it is installed such as the Internet and a network 16 inside the organization with maintaining security and it is required to have functions of preventing the following regarding the DNS:

A terminal 17 belonging to the network 15 obtains a host name of a terminal 18 belonging to the network 16, its IP address information, and information on a name space of the network 16.

The terminal 17 causes an abnormal operation in a DNS server 11 by transmitting a packet illegal in the DNS protocol to the DNS server 11 through the network 15.

The terminal 18 or a DNS server 11 transmits a packet abnormal in the DNS protocol to a host belonging to the terminal 17 or the network 15.

In the embodiment of the present invention, the DNS server filter 1 satisfies these function requirements.

The DNS server 11 has functions of managing a part of the DNS information of the network 15 such as a sub-network to which an NIC (network interface card) 13 belongs and a part of the DNS information of the network 16 and of responding to an inquiry conforming to the DNS protocol.

A TCP/IP driver 12 is used for a control to perform a communication with a TCP/IP protocol through the NIC 13 and an NIC 14 and the DNS server filter 1 and the DNS server 11 are processes operating on the TCP/IP driver 12.

In addition, the firewall 10 has settings not authorizing a direct communication from the terminal 17 to the terminal 18 with the TCP/IP protocol (generally this kind of settings are represented by "IP forward is off") and the DNS server filter 1 and the DNS server 11 are set so as to accept only inquiry requests transmitted to the IP address of the NIC 13 or the NIC 14, respectively.

Figure 3:
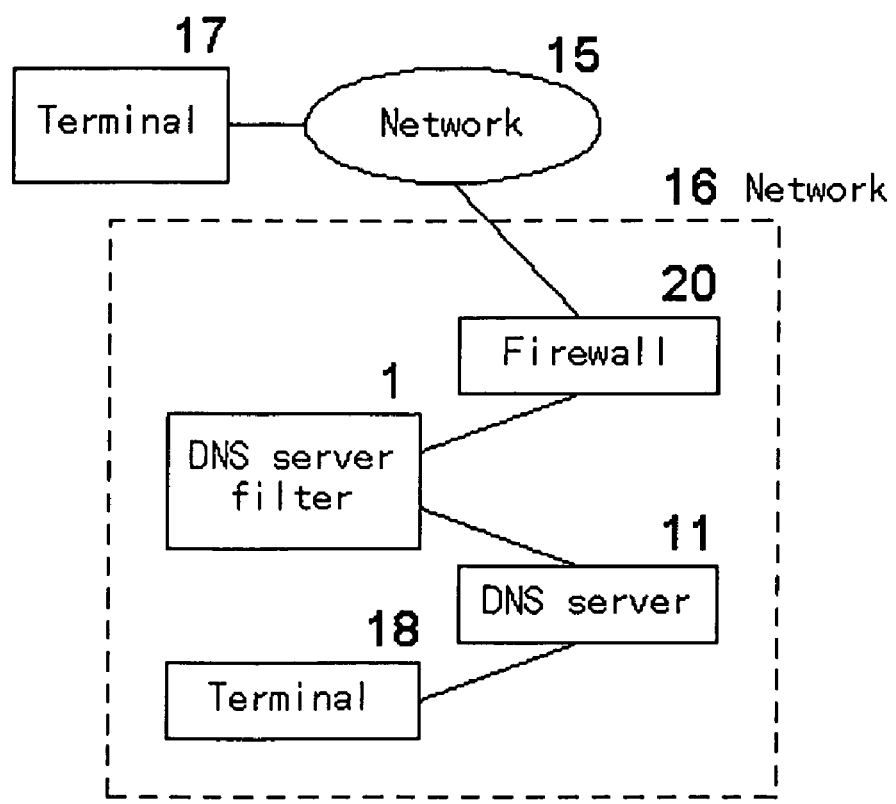
FIG. 3 is a diagram showing a constitution in which the DNS server filter according to an embodiment of the present invention is mounted on a single apparatus and installed in a network of an organization.

Referring to FIG. 3, there is shown a diagram of a constitution in which the DNS server filter 1 according to the embodiment of the present invention is mounted on a single apparatus and it is installed in a network of an organization. In FIG. 3, a firewall 20 is a packet filtering firewall, which is different from the firewall shown in FIG. 2, permits a direct communication using the TCP/IP protocol between the terminal 17 belonging to the network 15 outside the organization and the terminal 18 belonging to the network 16 inside the organization only for authorized ports and addresses by settings of the firewall 20.

In FIG. 3, the firewall 20 is installed for a purpose of protecting the network 16 with settings regarding the DNS protocol, by which an access from the terminal 17 with the DNS protocol through the network 15 is limited to the DNS server filter 1 without authorization of an access to the DNS server 11 inside the organization and by which the DNS server 11 and the terminal 18 are not authorized to access directly the host on the network 15 with the DNS protocol.

The firewall 20, the DNS server filter 1, the DNS server 11, and the terminal 18 belonging to the network 16 of the organization can communicate with each other not only with the DNS protocol, but with an arbitrary TCP/IP protocol.

The DNS server 11 makes settings of a fowarder for the DNS server filter 1. In other words, when receiving an inquiry request of a domain name or an IP address of the terminal 17 belonging to the network 15 from the terminal 18, the DNS server 11 recognizes that the inquiry request relates to a host not belonging to the network 16 and transfers (forwards) the inquiry request to the DNS server filter 1. A DNS server referenced by the terminal 18 is preset to the DNS server 11.

Figure 4:
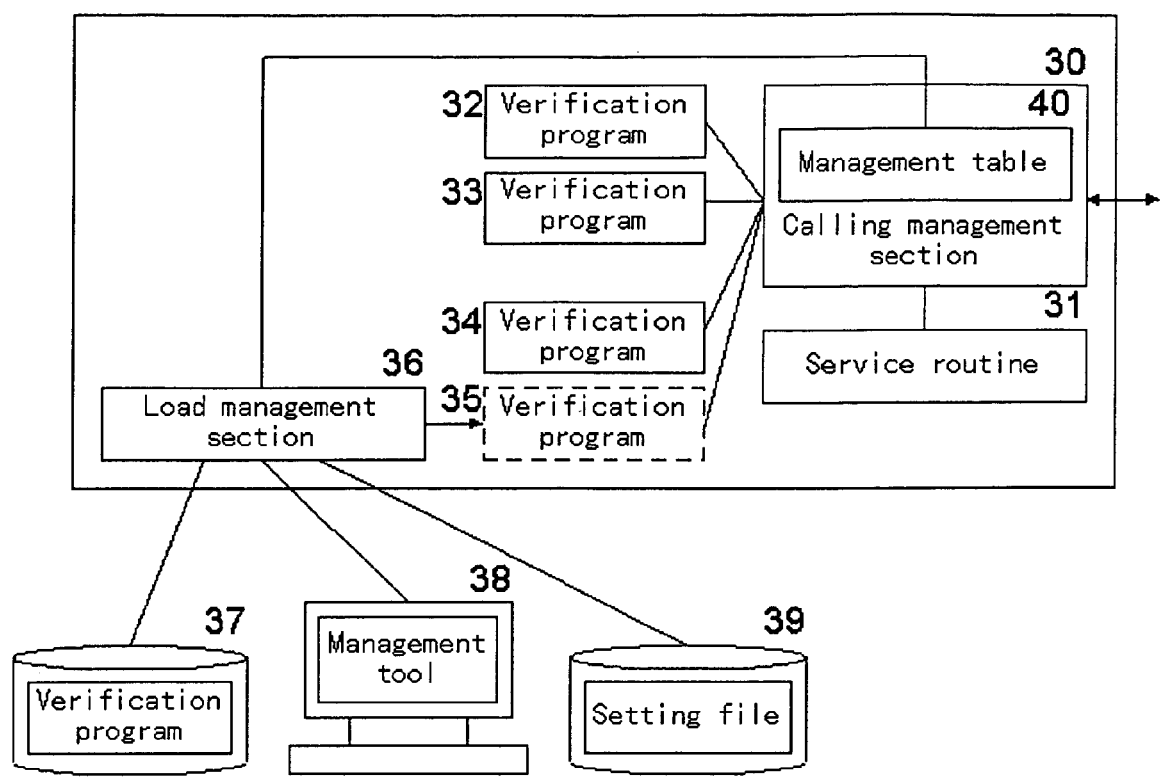
FIG. 4 is a diagram showing a constitution of a packet verification section in an embodiment of the present invention.

Referring to FIG. 4, there is shown a diagram of a constitution of the packet verification section 4 in the DNS server filter 1 according to the embodiment of the present invention. Further referring to FIG. 4, a calling management section 30 is used to select and execute one of the verification programs (software) 32, 33, 34, and 35 to be executed by referring to attributes of the verification programs (software) 32, 33, 34, and 35, having a program management table 40 for managing the verification programs.

A load management section 36 performs the following processing:

loading an execution file 37 of a verification program specified by a management tool 38 for inputting operation specification information having a management terminal or by information of a setting file 39 on a memory (a memory of a computer on which the DNS server filter is mounted) that is not shown;

causing the verification program loaded on the memory to be initialized;

registering an entry point of the verification program together with the obtained attribute onto the program management table 40 of the calling management section 30; and releasing the verification program specified to be deleted by the management tool 38 from the memory.

A service routine 31 is a subroutine group for using functions of the DNS server filter body called from the verification programs for facilitating development of the verification programs 32, 33, 34, and 35.

Figure 8:
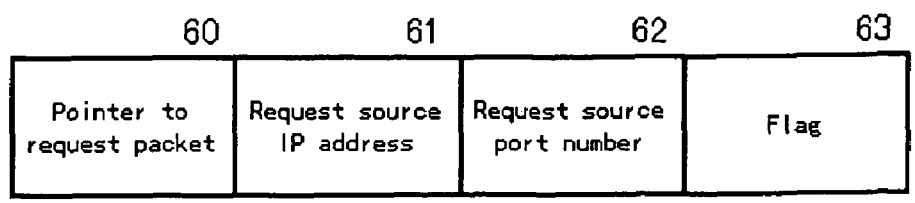
FIG. 8 is a diagram showing an example of entries of a session management table according to an embodiment of the present invention.

Referring to FIG. 7, there is shown an example of entries of the program management table 40 shown in FIG. 4. The table comprises the following entries:

an entry point address 50 of a verification program a priority 51 for an execution specified by a verification program an attribute 52 of a verification program specified by a verification program Referring to FIG. 8, there is shown an example of entries of the session management table 8 in the DNS server filter according to the embodiment of the present invention. The table comprises the following entries:

a request packet pointer 60 a request source IP address 61 of a request source issuing an inquiry request a request source port number 62 of a request source issuing an inquiry request a flag 63 indicating whether an inquiry request is transferred to another DNS server if a packet format of the inquiry request is normal.

Figure 5:
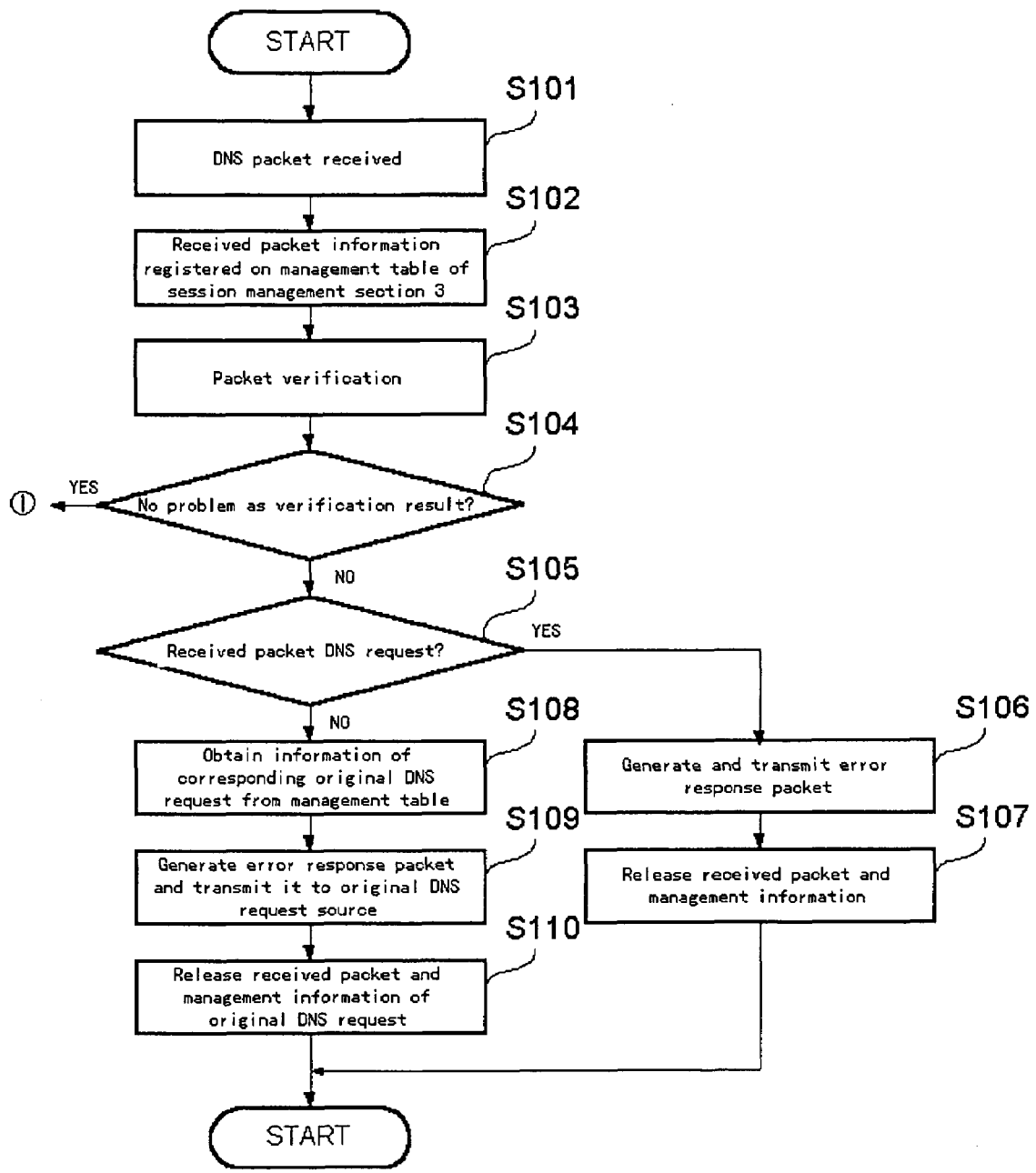
FIG. 5 is a flowchart of assistance in explaining processing of a DNS server filter according to an embodiment of the present invention.
Figure 6:
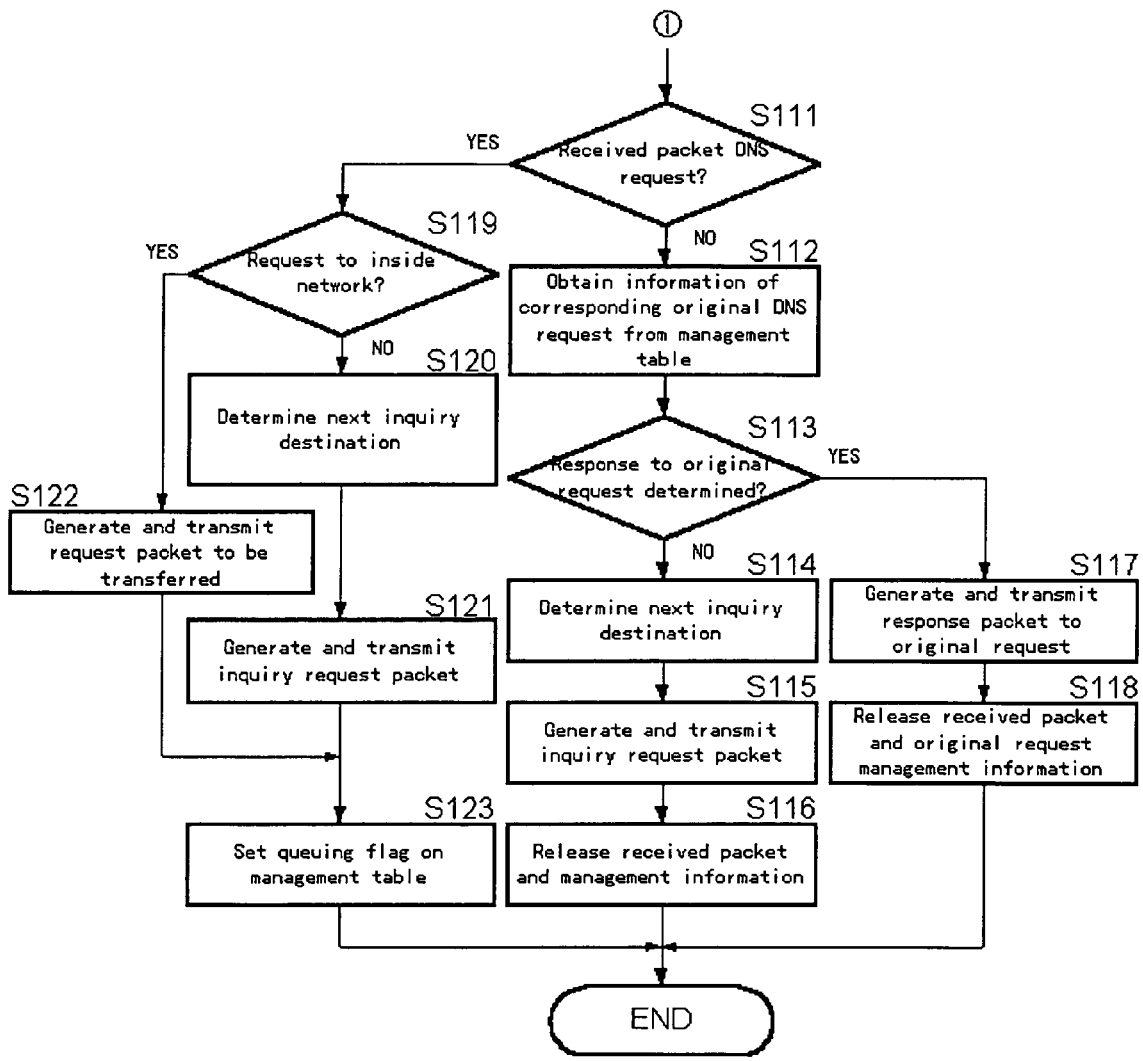
FIG. 6 is a flowchart of assistance in explaining processing of a DNS server filter according to an embodiment of the present invention.
Figure 9:
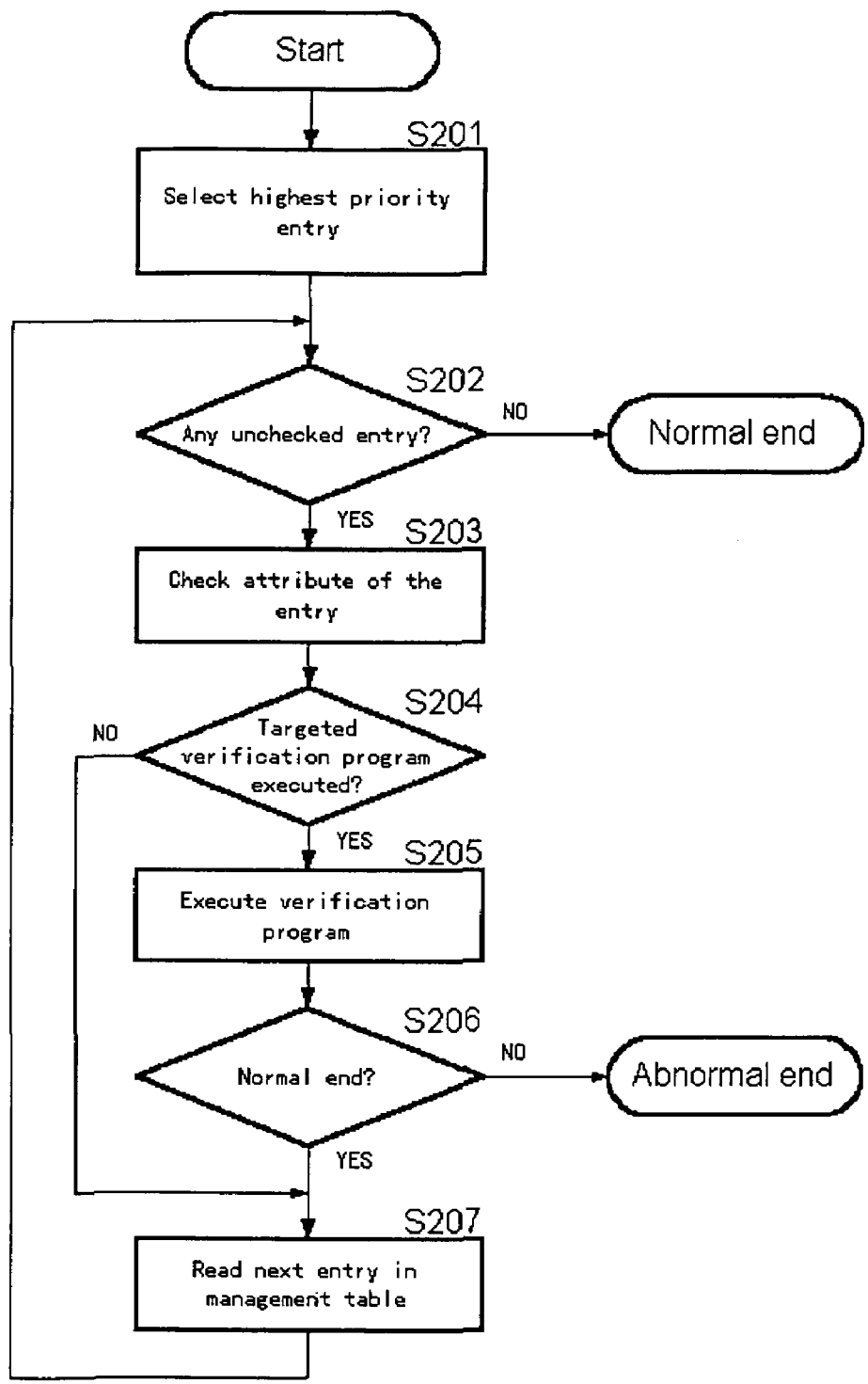
FIG. 9 is a flowchart showing a processing procedure of a verification program of the packet verification section according to an embodiment of the present invention.

Referring to FIGS. 5 and 6, there are shown flowcharts of assistance in explaining operation processing of the DNS server filter 1. Referring to FIG. 9, there is shown a flowchart of executing the verification programs of the packet verification section 4 shown in FIG. 4.

A description will be made below for operations of the DNS server filter 1 according to the embodiment of the present invention.

An operation of the DNS server filter 1 is described first below by referring to FIGS. 1, 5, and 8.

In step S101, the packet receiving section 2 receives a DNS packet and transmits the packet to the session management section 3. In step S102, the session management section 3 puts an IP address of a transmission source of the received packet in the entry 61 (See FIG. 8) of the management table 8, puts a port number of the received packet in the entry 62, and sets a value indicating "Testing" to the flag 63.

In the next step S103, the session management section 3 transmits the received packet to the packet verification section 4 to request a packet verification and the packet verification section 4 verifies the packet.

In step S104, it is judged whether there is any problem in a result of the verification in the packet verification section 4, and the control progresses to step S111 if the operation normally terminates (there is no problem) or it progresses to step S105 if the operation abnormally terminates.

In step S105, the session management section 3 checks a type of the received packet to judge whether it is an inquiry request (DNS request) and the control progresses to step S106 if it is a DNS request or to step S108 if it is a response packet.

In step S106, an error response need be returned to an inquiry source of this information, and therefore the session management section 3 requests the response generating section 6 to generate an error response packet and requests the packet transmitting section 7 to transmit the generated packet to destination of the entries 61 and 62 of the management table 8.

In the next step S107, regarding the received response packet, the information registered in the management table 8 is deleted and the received inquiry request packet is released to terminate the processing.

On the other hand, the state of a progression to step S108 selected since the received packet is not a DNS request in step S105 means that a normal inquiry request has been sent to the DNS server filter 1 before and currently an inquiry request is made for another DNS server, while due to the abnormal result an error response need be returned to inform the host issuing the original inquiry request that the inquiry is unsuccessful. Therefore, in step S108, the session management section 3 searches the session management table 8 to fetch a part related to the original inquiry request.

In the next step S109, by referring to an inquiry request packet from the entry 60 of the searched management table 8, the response generating section 6 is requested to generate an error response packet based upon it and then the packet transmitting section 7 is requested to transmit the generated response packet to a destination of the entries 61 and 62 in the management table 8.

In the next step S110, regarding the received response packet the information registered in the management table 8 is deleted to release the response packet and regarding an inquiry request corresponding to it the entries registered in the management table 8 are also deleted to terminate the processing.

If the result of the verification is normal as a result of the judgement in step S104, the control branches to step S111 shown in FIG. 6.

The session management section 3 checks a type of the received packet in step S111 shown in FIG. 6 and the control progresses to step S119 if it is an inquiry request packet or to step S112 if it is a response packet.

In step S112, the session management section 3 searches the management table 8 for information of an inquiry request corresponding to this response packet.

In the next step S113, the session management section 3 verifies whether the received response packet can be a response to the original inquiry request.

Unless a recursive inquiry in the DNS protocol is specified for the original inquiry request, a response packet having almost the same format as for the response packet can be returned directly. If a recursive inquiry is specified, however, an inquiry need be issued to the DNS server until the DNS server filter 1 obtains a response. For example, in searching for an IP address for a host name "www.foo.co.jp," the following need be inquired sequentially:

root DNS server

DNS server managing the "jp" domain

DNS server managing the "co.jp" domain

DNS server managing the "foo.co.jp" domain

Accordingly the DNS server in the middle of the sequence can be informed of only an address of the next DNS server (for example, the DNS server of the "co.jp" domain can be informed of only an address of the DNS server managing the "foo.co.jp" domain), and therefore this response packet only indicates a condition in the middle of the inquiry sequence to the original inquiry request, by which it cannot be a response.

This verification is performed in step S113 and the control progresses to step S114 if there is a need for making a further inquiry, while otherwise the control progresses to step S117.

A state of step S114 has a meaning of a need for issuing an inquiry to another DNS server in the DNS server filter 1. Therefore, in step S114, the session management section 3 determines the next inquiry destination from the information of the received response packet.

Then, in the next step S115, the session management section 3 requests the request generating section 5 to generate an inquiry request packet and requests the packet transmitting section 7 to transmit it to the next inquiry destination.

In the next step S116, the session management section 3 deletes information on the response packet in the progress of the received inquiry from the management table 8 and releases the response packet to terminate the processing.

A state of step S117 has a meaning of a reception of a response packet that can be a response to the original inquiry packet. Therefore, in step S117, the session management section 3 requests the response generating section 6 to generate a response packet to the original inquiry request reflecting a result of a response packet receiving the response packet and requests the packet transmitting section 7 to transmit it to the transmission source of the original inquiry request.

In the next step S118, information related to the received response packet is deleted from the management table 8, information related to the original inquiry request is deleted from the management table 8, and the response packet is released to terminate the processing.

If the received packet is an inquiry request (a DNS request) as a result of the judgement in step S111, the session management section 3 checks a transmission source of the received packet in step S119, and the control progresses to step S122 if it is an inquiry from the network inside the organization, while otherwise the control progresses to step S120.

A state of step S120 means that the DNS server filter 1 must start to issue an inquiry to the DNS server outside the organization instead of the inquiry source in order to cope with the inquiry request from the network outside the organization. Therefore, in step S120, the session management section 3 determines a DNS server outside the organization for an inquiry, first (in many cases, it is a normal root server).

In the next step S121, the session management section 3 requests the request generating section 5 to generate an inquiry request based upon the original inquiry request and requests the packet transmitting section 7 to transmit the inquiry request packet to the DNS server determined in step S120.

On the other hand, a state of step S122 means that an inquiry related to the network inside the organization is received. To obtain information related to the network inside the organization, the DNS server filter 1 transfers (forwards) an inquiry to the DNS server 11 inside the organization.

Accordingly, in step S122, the session management section 3 requests the request generating section 5 to generate an inquiry request packet based upon the received inquiry request packet and requests the packet transmitting section 7 to transmit the inquiry packet to the DNS server 11.

A state of step S123 means that the DNS server filter 1 is currently making an inquiry to another DNS server due to a reception of the inquiry request. Therefore, in step S123, the session management section 3 sets an "Inquiring" value to the flag 63 among the entries of the management table 8 corresponding to the received packet and sets a pointer to the received packet to the entry 60 among the entries of the management table 8 to terminate the processing.

Next, a description will be made for the packet verification section 4 by referring to FIG. 9.

In step S201, the management table 40 of the calling management section 30 of the packet verification section 4 is searched for to find out an entry having the highest priority 51 value in the management table 40 (in implementation, preferably respective entries are arranged in a priority order) and the entry is determined.

In the next step S202, it is verified whether there is an entry which has not been referred to, and the control progresses to step S203 if there is an entry which has not been referred to yet.

In step S203, the calling management section 30 checks the attribute 52 among the entries of the management table 40 to judge whether to execute the corresponding verification program.

The attribute 52 is specified by each verification program; a load management section 36 sets a value of the attribute to be transmitted to the load management section 36 at initialization of the verification program after loading the verification program file 37 with the load management section 36 by a setting file 39 at initialization of the DNS server filter 1 or by the management tool 38 during execution, and the value indicates a type of a verification program such as one for checking an inquiry request packet or for checking a response packet.

In the next step S204, if it is determined that the verification program corresponding to the entry of the management table 40 is executed by the calling management section 30, the control progresses to step S205, while otherwise the control progresses to step S207.

In step S205, the calling management section 30 calls an entry point of the verification program of the entry 50 in the management table 40.

In step S206, the calling management section 30 judges whether the processing is normally terminated from a result of the verification program called in step S205; if the processing is normally terminated the control progresses to step S207, while its abnormal termination means an occurrence of an error in the verification program, namely means that the received DNS packet is judged not to be acceptable on the grounds of not meeting security requirements of the organization and therefore the error indication is transmitted to the session management section 3 which is a calling source of the packet verification section 4 to terminate the processing.

In step S207, to check the received packet with the next verification program, the calling management section 30 searches for a verification program having the highest priority next to the priority of the previously executed verification program or having the same priority as for the previous one by referring to the priority 51 of the management table 40 and then the control progresses to step S202.

In this manner, the packet verification section 4 repeats processing of steps S202 to S207, and if it is judged there is no verification program to be executed any more in step S202, it means that all of the already executed verification programs have been normally terminated and therefore the packet verification section 4 normally terminates since the received DNS packet meets the security requirements of the organization.

Next, the operation is described below by giving a concrete example.

Referring to FIG. 2, there is shown a diagram of a constitution in which the DNS server filter 1 is installed in the firewall 10. It is supposed that the terminal 17 belonging to the network 15 outside the organization has attempted to obtain an IP address of the terminal 18 belonging to the network 16 inside the organization. The terminal 17 is assumed to be informed of a host name of the terminal 18, but not informed of a DNS server in which the information is stored.

First, the terminal 18 obtains information of the DNS server managing the domain of the organization from the DNS server belonging to the network 15 outside the organization, and the IP address turns out to be an IP address corresponding to the NIC 13 of the firewall 10.

Next, the terminal 17 connects with the DNS server filter 1 waiting on the IP address of the NIC 13 of the firewall 10 which it considers to be a DNS server of the organization in order to inquire an IP address corresponding to the host name of the terminal 18.

The DNS server filter 1 which has received the inquiry request calls the packet verification section 4 to verify whether this DNS packet satisfies the security requirements of the organization.

If a format of the DNS packet transmitted by the terminal 17 is abnormal and there is any target to be checked by the verification program, the verification program returns an error for the packet and the DNS server filter 1 returns an error response to the terminal 17.

If there is registered a program for realizing a security requirement of not providing information on the host inside the organization to the verification program though the DNS packet transmitted by the terminal 17 has a normal format, the verification program returns an error to the packet and the DNS server filter 1 returns an error response to the terminal 17.

Unless there is registered a program for realizing a security requirement of not providing information on the host inside the organization to the verification program though the DNS packet transmitted by the terminal 17 has a normal format, the DNS server filter 1 transfers the request to the DNS server 11 so as to obtain the IP address of the terminal 18 and returns it as a response to the terminal 17.

Next, a description will be given below for a case in which the terminal 18 obtains an IP address of the terminal 17 in the constitution shown in FIG. 2.

First, the terminal 18 requests the DNS server of the network 16 inside the organization to transmit information of the network outside the organization and therefore the DNS server transfers an inquiry for the request to the DNS server 11 waiting in the NIC 14 of the firewall 10.

The DNS server 11 is preset so as to transfer an inquiry about a network outside the organization to the DNS server filter 11.

The DNS server filter 1 which has received the inquiry request packet confirms that the DNS packet is normal and then issues an inquiry to the DNS server outside the organization to obtain a response packet; if the packet is normal, a result is returned to the terminal 18 through the DNS server 11.

If the DNS server of the terminal 17 returns an abnormal response packet, the DNS server filter 1 returns an error response to the DNS server 11 and the error response is also returned to the terminal 18.

As an abnormal response packet, for example, such a case is reported that false information is added to additional information of the DNS packet for a purpose of wiretapping a communication with the outside of the organization as well as a response packet having an abnormal format.

Referring to FIG. 3, there is shown an example of a DNS server filter 1 independently installed in the network 16 inside the organization.

In the constitution shown in FIG. 3, a communication with a DNS packet is almost the same as for one shown in FIG. 2 in the above. These constitutions differ from each other in that the terminal 17 is inhibited to access the DNS server 11 directly by the TCP/IP driver 12 in the constitution shown in FIG. 2 while a packet-filter firewall 20 makes settings of the inhibition in the constitution shown in FIG. 3.

In the present invention, implementation is made so as to include processing for determining to return a negative acknowledge if there is an inquiry made to a host belonging to a domain previously registered in the packet verification section 4, thereby achieving a construction of a system for satisfying a requirement of inhibiting accesses to the host irrelevant to services of the organization such as a technique called "contents filtering" in the WWW server.

Furthermore in the present invention, excessive inquiries can be reduced by adding a cache memory for previously storing DNS server information to the DNS server filter.

While the present invention has been described above by giving an example of processing related to security in the embodiments, it is apparent that the present invention is not limited to those for objects related to security.

As set forth hereinabove, according to the present invention, there is provided a constitution for checking a DNS packet for obtaining information such as a host name, a domain name, and an IP address transmitted by a person outside the organization from a network outside the organization using a DNS protocol and for returning an error response if an abnormality is detected, by which effects of preventing the following can be achieved:

a person outside the organization invades the network of the organization by utilizing private information of the organization; and a reception of a packet having an abnormal format causes an abnormal operation of the DNS server.

In addition, according to the present invention, there is provided a constitution for checking a DNS packet for obtaining information such as a host name, a domain name, and an IP address transmitted to the DNS server belonging to a network outside the organization by a person inside the organization in a DNS protocol and for returning an error response if an abnormality is detected, by which there are effects of preventing an abnormal operation in the DNS server belonging to the network outside the organization and of discharging management responsibilities of the organization to other organizations belonging to networks outside the organization.

In the packet verification means of the DNS server filter according to the present invention, a user can add or delete data and a description method of a verification program is indicated clearly so that a user can generate a verification program by himself or herself, by which there are effects that the user can cope with a problem of the DNS server turned out anew and that and, if the DNS server is replaced with one prepared to solve the problem, verification programs unnecessary to solve the problem can be deleted so as to improve performance of the DNS server filter.

Although the invention has been described in detail above in connection with various preferred embodiments thereof, it will be appreciated by those skilled in the art that these embodiments have been provided solely for purposes of illustration, and are in no way to be considered as limiting the invention. Instead, various modification and substitutions of equivalent techniques will be readily apparent to those skilled in the art upon reading this specification, and such modifications and substitutions are to be considered as falling within the true scope and spirit of the following claims.

What is claimed is:

1. A DNS server filter apparatus comprising:
   packet verification means for verifying whether there is any abnormality in contents of a received DNS (domain name system) packet before transmitting it to a DNS server and for verifying whether there is any abnormality in contents of a to-be-transmitted DNS packet before transmitting it from the DNS server; and
   error response means for generating an error response packet and transmitting it to a request source if an abnormality is detected,
   wherein said packet verification means checks the received DNS packet for obtaining information on a host name, a domain name, and an IP (Internet protocol) address transmitted from a network outside an organization by a person outside the organization using a DNS protocol; and
   wherein said error response means generates an error response packet and transmits it to a request source when detecting an abnormality, thereby preventing the person outside the organization from invading a network of the organization by using private information of the organization and preventing the DNS server from operating abnormally by receiving a packet having an abnormal format, and wherein said packet verification means checks the to-be-transmitted DNS packet for obtaining information on a host name, a domain name, and an IP address transmitted to a DNS server belonging to a network outside the organization by a person inside the organization using a DNS protocol, and wherein said error response means generates an error response packet and transmits it to the request source when detecting an abnormality, thereby preventing the person inside the organization from invading the network outside the organization.

2. A DNS server filter apparatus claimed in claim 1:

wherein said packet verification means checks a DNS packet, being sent from an inside network of an organization to an outside network outside of the organization, for obtaining information on a host name, a domain name, and an IP address transmitted to a DNS server belonging to the outside network outside the organization from a terminal inside the organization using the DNS protocol; and wherein said error response means generates an error response packet and transmits it to a request source when detecting an abnormality, blocking the transmission of the DNS packet from the inside network to the outside network, thereby preventing said DNS server belonging to the outside network outside the organization from operating abnormally.

3. A DNS server filter apparatus claimed in claim 1, further comprising:

adding and deleting means for adding or deleting abnormality detecting conditions of the DNS packet.

4. A firewall apparatus wherein there is mounted said DNS server filter apparatus claimed in claim 1.

5. A network system, comprising:

a packet filtering firewall apparatus;

a DNS packet filter apparatus to communicate with the firewall apparatus and comprising packet verification means for verifying whether there is any abnormality in contents of a received DNS (domain name system) packet before transmitting it to a DNS server and for verifying whether there is any abnormality in contents of a to-be-transmitted DNS packet before transmitting it from the DNS server; and error response means for generating an error response packet and transmitting it to a request source if an abnormality is detected; and a DNS server for communicating with said DNS packet filter apparatus.

6. A DNS server filter apparatus comprising:

a packet receiving section for receiving an inquiry from a terminal or a DNS server and a response packet from a DNS server, the packet receiving section for receiving an inquiry from both i) within inside an organization's network, concerning an outgoing DNS packet, and ii) from outside an organization's network, concerning an incoming DNS packet, so as to provide packet verification for verifying whether there is any abnormality in contents of the incoming DNS packet before transmitting the packet to the inside the organization's network and for verifying whether there is any abnormality in contents of the outgoing DNS packet before transmission from inside the organization's network to outside the organization's network;

a session management section for managing inquiry packets and response packets for an entire control, having a session management table for managing inquiry requests;

a packet verification section for verifying whether the inquiry packet or the response packet is abnormal;

a request generating section for generating an inquiry packet to the DNS server;

a response generating section for generating a response packet to be returned to a transmission source of the inquiry packet;

a packet transmitting section for transmitting the inquiry packet and the response packet; and response means for verifying whether there is any abnormality in contents of the received packet in a DNS protocol before transmitting the packet to the DNS server regarding the received packet in the DNS protocol and generating an error response packet to transmit it to a request source if an abnormality is detected.

7. A DNS server filter apparatus claimed in claim 6:

wherein said packet verification section comprises a calling management section for controlling operations of selecting and executing a verification program to be executed by referring to an attribute of said verification program, having a program management table containing entry point address information of the verification program, priority information of executing the verification program, and attribute information of the verification program;

a storage device in which the verification program is stored;

a load management section for loading an execution file of a verification program specified by a management tool or by a setting file on a memory, for initializing the loaded verification program, for registering an entry point of the verification program onto said program management table of said calling management section together with the obtained attribute, and for controlling a verification program specified to be deleted by said management tool so as to be released; and a service routine comprising a subroutine group for utilizing functions of a DNS server filter body called by the executed verification program.

8. A DNS server filer apparatus claimed in claim 7:

wherein said session management table comprises a pointer to a request packet, an IP address of a request source which has issued an inquiry request, a port number of the request source which has issued the inquiry request, and a flag indicating whether the inquiry request has been transferred to another DNS server if the inquiry request has a normal packet format;

wherein said packet receiving section receives a DNS packet and then transmits the packet to said session management section; and wherein said session management section makes settings of an IP address of a transmission source of the received packet, a port number of the received packet, and a flag value indicating "Testing" in said session management table, transmits the received packet to said packet verification section to request a packet verification, checks a type of said received packet to judge whether it is an inquiry request if there is any problem in contents of the verification as a result of the verification of said received packet in said packet verification section;

wherein if it is judged to be an inquiry request as a result of the judgement, the session management section requests said response generating section to generate an error response packet, requests said packet transmitting section to transmit the generated packet to a destination specified by the request source IP address and the request source port number on said session management table, and deletes information registered in said session management table regarding the received packet to release the received inquiry request packet; and wherein, unless it is an inquiry request, the session management section searches said session management table to fetch a part related to an original inquiry request, requests said response generating section to generate an error response packet based upon an inquiry request packet by referring to the inquiry packet from the request packet pointer of an entry of said searched session management table, requests said packet transmitting section to transmit the generated response packet to a destination specified by the request source IP address and the request source port number on said session management table, deletes information registered in said session management table regarding the received response packet to release the response packet and deletes the entry registered in said session management table regarding the inquiry request corresponding to the response packet.

9. A DNS server filter apparatus claimed in claim 8:

wherein said session management section checks a type of the received packet if there is no problem as a result of the packet verification performed in said packet verification section, searches said session management table for information on the inquiry request corresponding to the response packet if it is a response packet, and verifies whether the received response packet can be a response to the original inquiry request;

wherein if there is a need for making an additional inquiry as a result of said verification, said session management section determines the next inquiry destination from the information of the received response packet, requests said request generating section to generate an inquiry request packet, requests said packet transmitting section to transmit it to the next inquiry destination, and deletes information, on the response packet in progress of the received inquiry from said session management table to release the response packet; and wherein if the received response packet can be a response to the original inquiry request packet as a result of said verification, the session management section requests said response generating section to generate a response packet to the original inquiry request reflecting the result of the response packet of receiving the response packet, requests said packet transmitting section to transmit it to the transmission source of the original inquiry request, deletes information related to the received response packet from said session management table, and deletes information related to the original inquiry request from said session management table to release the response packet.

10. A DNS server filter apparatus claimed in claim 8:

wherein said session management section checks a type of the received packet if there is no problem as a result of the packet verification in said packet verification section, checks a transmission source of the received packet if the received packet is an inquiry request and then unless said transmission source is a network inside an organization issuing an inquiry, determines a DNS server outside the organization to which an inquiry is issued first to meet the inquiry request of a network outside the organization, requests said request generating section to generate an inquiry request based upon the original inquiry request, and requests said packet transmitting section to transmit the inquiry to said determined DNS server, or if said transmission source is the network inside the organization issuing the inquiry, requests said request generating section to generate an inquiry request packet base upon the received inquiry request packet, requests said packet transmitting section to transmit the inquiry packet to the DNS server, sets a "Inquiring" value to the flag among the entries of said session management table corresponding to the received packet, and sets a pointer to the received packet to the pointer of the entry on said session management table.

11. A DNS server filter apparatus claimed in claim 6, wherein a cache memory previously stores DNS server information.

12. The filter of claim 6, wherein, the incoming DNS packet is checked for the any abnormality by obtaining information on a host name, a domain name, and an IP (Internet protocol) address transmitted from the network outside an organization by a person outside the organization using a DNS protocol, and, detection of the any abnormality prevents the incoming DNS packet from being transmitted into the organization's network, thus preventing the person outside the organization from invading a network of the organization by using private information of the organization and preventing the DNS server from operating abnormally by receiving a packet having an abnormal format, and wherein the outgoing DNS packet is checked for the any abnormality by obtaining information on a host name, a domain name, and an IP address transmitted to a DNS server belonging to a network outside the organization by a person inside the organization using a DNS protocol, and, the detection of the any abnormality preventing the outgoing DNS packet from being transmitted outside the organization's network, thus preventing the person inside the organization from invading the network outside the organization.

13. A record medium having a program recorded therein and capable of executing:

packet receiving processing for receiving an inquiry from a terminal or a DNS server in the DNS protocol and a response packet from a DNS server via a communication apparatus, the packet receiving processing being for receiving an inquiry from both within inside an organization's network, concerning an outgoing DNS packet, and from outside an organization's network, concerning an incoming DNS packet, so as to provide packet verification for verifying whether there is any abnormality in contents of the incoming DNS packet before transmission of the packet to the inside the organization's network and for verifying whether there is any abnormality in contents of the outgoing DNS packet before transmission from inside the organization's network to outside the organization's network;

session management processing for managing inquiries and response packets for an entire control, having a session management table for managing the inquiry requests;

packet verification processing for verifying whether an inquiry or a response packet is abnormal;

request generation processing for generating an inquiry packet to a DNS server;

response generation processing for generating an inquiry packet to the DNS server;

response generation processing for generating a response packet to be returned to a transmission source of the inquiry packet;

packet transmission processing for controlling an operation so as to transmit an inquiry and a response packet through a communication apparatus; and DNS server filter processing for verifying whether there is any abnormality in contents of the packet before transmitting the packet to the DNS server regarding the received DNS packet and, if an abnormality is detected, it generates and transmits an error response packet.

14. A record medium claimed in claim 13, having a program recorded therein and capable of executing:

wherein said program management table comprises entry point address information of the verification program, priority information of executing the verification program, and attribute information of the verification program;

wherein the calling management processing is performed for selecting and executing a verification program to be executed by referring to the attribute of said verification software; and wherein the load management processing is performed for loading an execution file of the verification program specified by a management tool or a setting file on a memory, for initializing the loaded verification program, for registering an entry point of the verification program together with an obtained attribute on said program management table, and for releasing a verification program specified to be deleted by said management tool from the memory.

15. A group of recording media, wherein said program claimed in claim 14 is divided into a plurality of portions and said portions are recorded on said media, respectively.

16. A group of recording media, wherein said program claimed in claim 13 is divided into a plurality of portions and said portions are recorded on said media, respectively.

17. The record medium of claim 13, wherein the program recorded therein is capable of executing:

checking the incoming DNS packet for the any abnormality by obtaining information on a host name, a domain name, and an IP (Internet protocol) address transmitted from the network outside an organization by a person outside the organization using a DNS protocol, and, detection of the any abnormality prevents the incoming DNS packet from being transmitted into the organization's network, thus preventing the person outside the organization from invading a network of the organization by using private information of the organization and preventing the DNS server from operating abnormally by receiving a packet having an abnormal format, and checking the outgoing DNS packet for the any abnormality by obtaining information on a host name, a domain name, and an IP address transmitted to a DNS server belonging to a network outside the organization by a person inside the organization using a DNS protocol, and, the detection of the any abnormality preventing the outgoing DNS packet from being transmitted outside the organization's network, thus preventing the person inside the organization from invading the network outside the organization.

18. A program embodied as electric signals, comprising:

packet receiving processing for receiving an inquiry from a terminal or a DNS server in the DNS protocol and a response packet from the DNS server via a communication apparatus, the packet receiving processing being for receiving an inquiry from both within inside an organization's network, concerning an outgoing DNS packet, and from outside an organization's network, concerning an incoming DNS packet, so as to provide packet verification for verifying whether there is any abnormality in contents of the incoming DNS packet before transmission of the packet to the inside the organization's network and for verifying whether there is any abnormality in contents of the outgoing DNS packet before transmission from inside the organization's network to outside the organization's network;

session management processing for managing the inquiry and the response packet for an entire control using a session management table for managing inquiry requests;

packet verification processing for verifying whether the inquiry and the response packet are abnormal;

request generation processing for generating an inquiry packet to the DNS server;

response generation processing for generating a response packet returned to a transmission source of the inquiry packet;

packet transmission processing for controlling an operation to transmit the inquiry and the response packet via the communication apparatus; and DNS server filter processing for verifying whether there is any abnormality in contents of the received DNS packet before transmitting the packet to the DNS server regarding the received DNS packet and for generating and transmitting an error response packet when detecting an abnormality.

19. A program claimed in claim 18 embodied as electric signals, further comprising:

a program management table having entry point address information of the verification program, priority information for executing the verification program, and attribute information of the verification program, calling management processing for selecting and executing a verification program to be executed by referring to the attribute of said verification software; and load management processing for loading an execution file of the verification program specified by a management tool or a setting file on a memory, for initializing the loaded verification program, for registering an entry point of the verification program together with the obtained attribute on said program management table, and for releasing the verification program specified to be deleted by said management tool from the memory.

* * * * *